July 2, 1946.  W. P. LEAR  2,403,101
POWER TRANSMISSION CONTROL UNIT
Filed Dec. 18, 1944
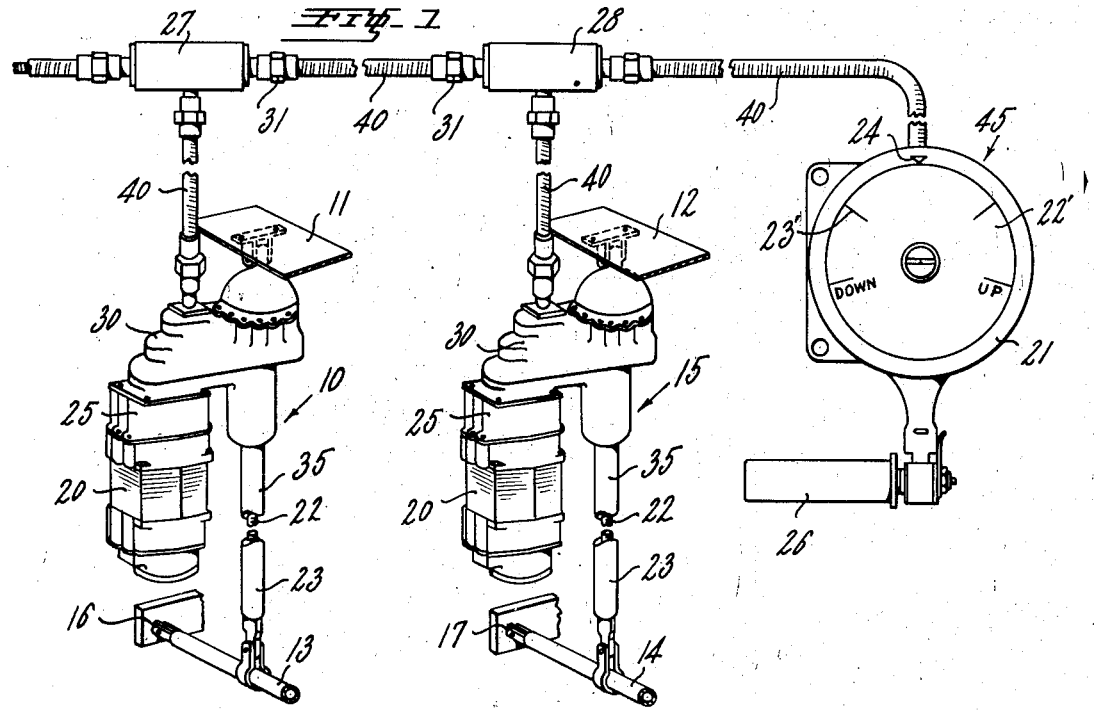
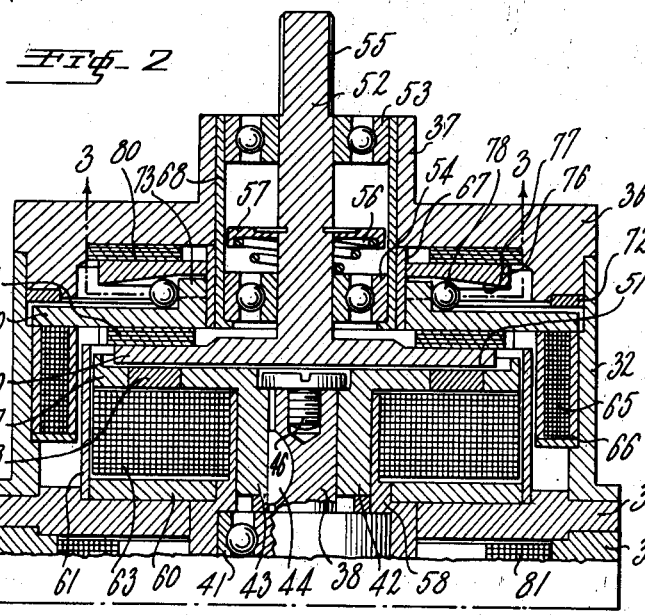
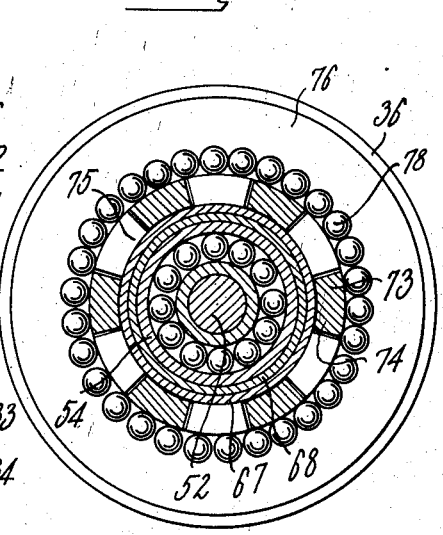
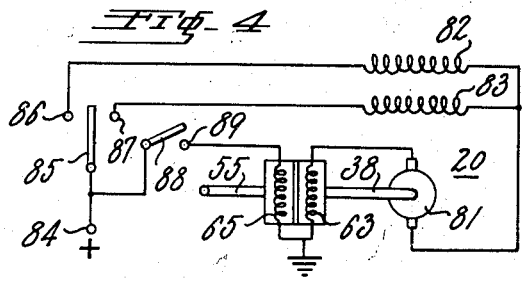
INVENTOR.
WILLIAM P. LEAR
BY
*Richard A Marser*
ATTORNEY Patented July 2, 1946

2,403,101

UNITED STATES PATENT OFFICE 2,403,101

POWER TRANSMISSION CONTROL UNIT

William P. Lear, North Hollywood, Calif., assignor, by mesne assignments, to Lear, Incorporated, Grand Rapids, Mich., a corporation of Illinois Application December 18, 1944, Serial No. 568,650

18 Claims. (Cl. 192—.02)

This invention relates to a power transmission unit, and more particularly to an electromagnetic clutch and brake unit incorporating a speed governing arrangement.

The invention is particularly applicable to controlling the position of movable components aboard an aircraft. On the larger modern aircraft, such components are individually power driven and their position is remotely controlled from a location adjacent the pilot. Where a group of such components are to be operated in synchronism, the actuators therefor may be mechanically interconnected by suitable means such as a flexible cable. Thereby, upon failure of the power drive means in any one of the components, the actuator for such component may be driven through the mechanical drive means from the power units of the other components.

In particular, the invention is applicable to operating a retractable landing gear for aircraft. As so applied, the invention includes an electromagnetic clutch which is energized upon energization of a power drive unit for the landing gear to connect such power drive unit to an actuator for the gear. When the power drive unit is deenergized, a driven member of the clutch is mechanically biased into engagement with a braking surface to disconnect the actuator from the power drive means and to effect substantially instantaneous stopping of the actuator and landing gear connected thereto. In the present arrangement, such braking surface is normally held stationary during power operation of the aircraft, but may be selectively released for rotation with the driven member of the clutch. Upon such release, the braking surface rotates with the actuator and driven member until such time as the actuator exceeds a predetermined speed. When such occurs, a supplemental braking device is brought into operation to effect speed control of the operation of the actuator.

With the described arrangement, the landing gear may be operated either by power or by gravity. If operating solely by gravity, the rate of movement of the landing gear is kept from exceeding a predetermined value by the supplemental braking means incorporated in the power transmission unit of the invention. Thereby, the lowering speed of each landing gear is kept at a safe value.

It is among the objects of this invention to provide a power transmission unit including an electromagnetic clutch and brake unit incorporating supplemental speed control means; to provide a power transmission unit having a braking means associated therewith which is normally effective to stop rotation of a driven system connected to the clutch, but may be selectively released to rotate with such system; to provide a power transmission and drive unit including speed responsive means at times operative to control the rate of movement of a driven system connected thereto; and to provide a simple, reliable combined electromagnetic clutch, brake and speed control unit.

These and other objects, advantages and features of the invention will be apparent from the following description and the accompanying drawing. In the drawing:

Fig. 1 is a perspective view of a retractable aircraft landing gear operating system incorporating the invention.

Fig. 2 is a longitudinal sectional view through a power transmission control unit embodying the invention.

Fig. 3 is a view on the line 3—3 of Fig. 2.

Fig. 4 is a schematic wiring diagram illustrating electric control circuits for the invention.

Generally speaking, the invention comprises an electromagnetic clutch unit having driving and driven members of magnetic material and including a magnetizing winding connected in circuit with an electric motor. When the motor is energized, the magnetizing winding creates magnetic flux for effecting magnetic and frictional engagement between the driving and driven members of the clutch. Upon deenergization of the motor, resilient means mechanically bias the driven member of the clutch into engagement with a brake shoe mounted on a braking plate. Selectively operable means may be provided to energize and deenergize a magnetizing winding for creating a magnetic flux circuit including such braking plate to either hold the same against rotation or to permit the braking plate to rotate with the driven member of the clutch. When the braking plate is free to rotate, a speed responsive means prevents the driven member and the braking plate from exceeding a predetermined rate of movement. Such speed responsive means comprises a second braking plate interlocked with the first braking plate for rotation therewith, but movable toward and away therefrom. When the speed of the interlocked braking plates exceeds a preselected value, centrifugal force responsive means urge the braking plates apart to effect engagement of the second braking plate with a fixed braking surface to reduce the speed of the braking plates below such predetermined value.

Referring to Fig. 1 of the drawing, linear actuator units 10 and 15 are illustrated as connected at one end to relatively fixed supports 11 and 12 which may be part of the fuselage of an aircraft. At their opposite ends, units 10 and 15 are pivotally connected to elements or struts 13 and 14 of retractable landing gear which are pivotally mounted as at 16 and 17 on a fixed portion of the aircraft fuselage. The arrangement illustrates how the apparatus may be used for actuating a pair of main landing wheels for an aircraft. With a tricycle type landing gear, another actuator unit would be provided and connected in a manner similar to the units 10 and 15.

For illustrative purposes only, units 10 and 15 are shown as of the type described and claimed in my copending application Serial Number 483,515 filed April 17, 1943, for "Unitary mechanical actuator device." Each unit comprises a unitary assembly including a high speed electric motor 20, a power transmission or drive unit 25 incorporating the present invention, a gear housing 30 and a jack-screw 35. Drive unit 25 is connected in electrical circuit relation with motor 20. When the motor is energized, the drive unit 25 is likewise energized to connect the motor to reduction gearing in gear housing 30. Jack screw 35 comprises a screw 22 and a sleeve member 23 having threads engaging those of the screw. The screw and the sleeve are relatively rotatable with respect to each other, and one may be fixed against rotation and the other rotated by the gearing in housing 30. Thereby, when motor 20 is energized, it will extend and retract jack screw 35 through the medium of drive unit 25 and the gearing in housing 30.

While jackscrew type actuators are illustrated, it should be understood that the invention is not limited thereto, and that the actuators may simply comprise further reduction gearing interposed between that in housing 30 and struts 13 and 14. Alternatively, rotary actuator units of the type commonly used for operating wing flaps or landing gears of aircraft may be used in place of the linear jackscrew 35. Actuators 10 and 15 are interconnected for synchronous operation by suitable driving mechanism such as flexible shafting indicated generally at 40. While the driving means has been illustrated as flexible shafting, such illustration is exemplary only. Units 10 and 15 may be interconnected by gearing, rigid shafting, or any other type of driving connection. Due to such interconnection, in the event of failure of one or more of the motors 20, the actuator driven thereby, will be driven by the remaining motor through the medium of shafting 40.

In the event of failure of both motors 20, a manual drive means 45 is provided to operate actuators 10 and 15. As stated, drive units 25 are in electric circuit arrangement with motors 20. Therefore, in the event of failure of one motor 20, its drive unit 25 is deenergized to mechanically disconnect the motor from the gearing in housing 30, removing the idle motor load from the system and thereby reducing the amount of power required from the other motor to operate the associated actuator. Preferably, motors 20 are small high speed motors operating units 10 and 15 through reduction gearing, so as to develop high torque for such operation.

Manual drive means 45 may be of the type described and claimed in my copending application Serial No. 504,259 filed September 29, 1943, for "Remote control and indicator system." It includes a housing 21 having a face plate 22' on which are indicia 23' for indicating the relative position of struts 13 and 14. These indicia cooperate with a pointer 24 which is connected through mechanical shafting 40 with actuator units 10 and 15 so as to be operated in synchronism therewith. Drive mechanism 45 may be operated by a crank handle 26 which is shown in Fig. 1 in a position in which it is disconnected from driving mechanism contained in housing 21. When crank handle 26 is swung to a position at right angles to the plane of the drawing, it is connected to the gearing in housing 21 and thus to mechanical shafting 40 for operating units 10 and 15. The details of manual drive mechanism 45 are fully set forth in said copending application Serial No. 504,259.

The several sections of shafting 40 are interconnected by gear boxes 27 and 28, to which the shafting is coupled through suitable coupling means 31. Through gearing contained in boxes 27 and 28, the several sections of shafting 40 may extend at any angle to each other.

The drive unit 25 which forms the particular subject matter of this application, is illustrated more particularly in Figs. 2 and 3. The elements of unit 25 are enclosed in a housing 32 secured to the end plate 33 of the casing 34 of motor 20. An end bell 36 is suitably secured to housing 32 and provided with a tubular extension 37. Armature shaft 38 of motor 20 projects outwardly from bearing 41 into housing 32.

Unit 25 comprises a driving clutch member 42 of magnetic material having a hub 43 secured on shaft 38 by a key 44, and held against longitudinal movement thereon by a screw 46. Drive member 42 also includes a disk portion 47 of magnetic material in which an annular insert 48 non-magnetic material is provided as described in my Patent No. 2,267,114 for "Electromagnetic clutch" which issued on December 23, 1941.

Clutching surface 47 is adapted to have direct frictional and magnetic coaction with clutching face 51 on a driven clutch member 50 of magnetic material. Driven clutch member 50 has a shaft portion 52 mounted in bearings 53, 54 in extension 37. The outer end of shaft 52 is splined as at 55 for cooperation with gearing contained in housing 30. For a purpose to be described, a spring 56 disposed between bearing 54 and a plate 57 on shaft 52 normally urges driven member 50 axially outward through extension 53.

To provide magnetic flux for causing frictional and magnetic coaction between the driving and driven members 42 and 50, a tubular member 58 of magnetic material is mounted in motor end bell 33 and extends outwardly into housing 32 in close relation with hub 43 of member 42. The magnetic circuit for establishing engagement between the clutching surfaces is completed by an annular plate 60 adjacent end bell 33 and an outer tubular member 61 extending forward into overlapping relation with members 42 and 50. A coil winding 63 is mounted on member 58 and connected in electric series relation with motor 20. Thereby, upon energization of motor 20, coil 63 will create a magnetic flux circuit between driving member 42, tubular member 61, annular member 60, tubular member 58 and hub 43 of member 42. Such magnetic circuit also includes the portion of disk 51 of driven member 50 adjacent non-magnetic member 48. At non-magnetic member 48, the flux path extends from driving member 42 into driven member 50, where it by-passes non-magnetic member 48, and then back into driving member 42. The non-magnetic member 48 increases the number of flux interlinkages and thus the magnetic attraction between the two clutch members, as described in my said Patent No. 2,267,114.

A second magnetizing winding 65 is mounted in a channel-shaped annular member 66 disposed between housing 32 and tubular member 61. Winding 65 is energized in a manner more particularly described hereinafter. When so energized, it completes a magnetic flux path including the channel-shaped casing 66 and a braking plate 70 of magnetic material which is mounted for axial sliding movement on a sleeve 67 disposed on a second sleeve 68 which latter is mounted in extension 37. A brake shoe 71 of deformable friction material such as cork, is mounted on braking plate 70 and adapted to coact with the disk portion 51 of driven clutch member 50. Such coaction takes place when clutch winding 63 is deenergized, and winding 65 is energized, whereupon spring 56 snaps driven clutch member 50 into engagement with brake shoe 71 on braking plate 70. Winding 65 when energized holds braking plate 70 stationary and driven clutch member 50 and the actuator connected thereto are rapidly brought to a stop, avoiding "overshooting" of the actuator. However, armature shaft 38 and driven clutch member 42 are free to rotate during such condition so that the rotational energy of the armature of core 20 is dissipated. Such braking action effects accurate remote control of the position of the landing gears connected to the driven clutch members through jackscrews 35 and the gearing in housing 30.

An annular bearing member 72 is mounted in a recess in end bell 36 adjacent the outer periphery of brake plate 70. Adjacent its inner periphery brake plate 70 is provided with a notched hub portion 73. The notches 74 of hub portion 73 interlock with notches 75 on a hub portion of a second braking plate 76, as shown in Fig. 3. Braking plate 76 thus rotates in interlocked relation with braking plate 70. The surface 77 of braking plate 76 adjacent braking plate 70 is inwardly dished to provide a radially tapered surface. A plurality of weights such as balls 78 are disposed between the braking plates and during rotation, are urged outwardly, under the influence of centrifugal force, to move the braking plates apart. During such movement, braking plate 70 is urged into engagement with driven clutch member 50, and braking plate 76 is urged into engagement with a stationary brake surface 80 fixed on end bell 36.

The operation of the described arrangement is as follows. Normally, winding 65 is energized, as by being connected, for instance, with the ignition circuit of the aircraft. This locks plate 70 against rotation. Winding 63 is desirably connected in electrical circuit relation with motor 20. Therefore, upon energization of motor 20, winding 63 will be energized to create a magnetic flux circuit and engage clutch disks 47 and 50 to connect armature shaft 38 of motor 20 to output shaft 52 of driving unit 25. Upon deenergization of motor 20, winding 63 is simultaneously deenergized. Thereupon, spring 56 snaps driven disk 50 into engagement with brake surface 71 on plate 70 which, as explained, has been fixed against rotation due to energization of winding 65.

When the energizing circuit for winding 65 is broken, as during manual operation of landing gear or wing flaps or when gravity operation thereof is desired, plate 70 is free to rotate. During such rotation, the centrifugal force acting on balls 78 tends to urge these balls radially outward between plates 70 and 76. At a preset speed, determined by the weight of balls 78, the relative distance from the center of rotation, and the mass of plates 70 and 76, balls 78 will move far enough outwardly between plates 70 and 76 to effect axial movement of plate 76 into engagement with brake surface 80. This will effect a reduction in the speed of rotation of shaft 52 until such time as the speed drops below that at which balls 78 exert a sufficient force on plate 76 to urge the same against brake surface 80. In this operation, the plates 70 and 76 operate as a centrifugal governor regulating the rate of lowering of the landing gear, for instance. During such speed control operation, with winding 63 being deenergized, spring 56 will maintain driven disk 50 in engagement with brake surface 71 so that shaft 52 is effectively connected to rotating plates 70 and 76.

The electrical control of the drive unit 25 will be made clear by a reference to Fig. 4. As shown in Fig. 4, motor 20 includes an armature 81 and reversely wound field winding 82 and 83, connected in parallel with each other and in series with armature 81. Winding 63 is likewise connected in series with armature 81. A control switch 85 is provided at a suitable location, preferably adjacent the pilot, and is connected to the positive terminal 84 of suitable source of direct current such as the usual 28 volt aircraft battery. When switch 85 is moved to engage a contact 86, motor 20 is energized through field winding 82 for operation in a direction to raise the landing gear struts 13 and 14. When switch 85 engages contact 87, motor 20 is energized through reversely wound field winding 83 to lower landing gear struts 13 and 14.

Winding 65 is selectively energized from battery terminal 84 through the medium of a suitable switch 88. Switch 88 is so arranged that it is normally closed on contact 89 when the aircraft is power operated. For this purpose, it may be connected to be operated in unison with the motor ignition switch of the aircraft. With winding 65 thus normally energized, braking plate 70 and thus braking surface 71 are normally held against rotation. When a motor 20 is energized to actuate its landing gear, clutch driven member 50 is urged into magnetic and frictional coaction with driving member 42 to couple the motor to its associated actuator. When motor 20 is deenergized, winding 63 is deenergized simultaneously therewith and spring 56 snaps the driven member into engagement with the now fixed brake shoe 71. This disconnects shaft 55 from armature shaft 38 and substantially instantly stops movement of the driven system connected to shaft 55. Meanwhile, motor armature 81 continues to rotate until its rotational energy has been dissipated.

If it is desired to effect operation of one actuator by the other actuator unit, or by manual drive means 45, through the medium of shafting 40—as would occur in the event the motor 20 of such one actuator became disabled—switch 88 is opened whereby winding 65 is deenergized. The shaft 52 of unit 25, which is in direct mechanical connection to the actuator, may then be rotated without carrying also either the load of the associated armature of motor 20 or of the brake between driven member 50 and brake shoe 71. Should the speed of such rotation effective on the actuator exceed a predetermined value, balls 78 will move outwardly under the influence of centrifugal force to urge braking plates 70 and 76 apart. Spring 56 maintains driven disk 50 in engagement with braking surface 71 of braking plate 70. The spring likewise prevents inward axial movement of disk 50 and braking plate 70. Accordingly, the action of balls 78 will be to effect outward axial movement of braking plate 76. This plate is thereby forced into engagement with fixed braking surface 80 to reduce the speed of such rotation to such designed value at which balls 78 are urged outwardly to effect the braking action. As explained, such design maximum speed value is dependent upon the weight of balls 78, their distance from the center of rotation, and the mass of the rotating axially movable parts and may be preselected in the design and the construction of the unit so that any desired maximum speed may be preset.

This action likewise takes place when it is desired to effect gravity lowering of the landing gear. The rate of lowering the landing gear is controlled by the interaction of balls 78 and braking plates 70 and 76, provided winding 65 is deenergized by opening switch 88—89. Normally, the speed responsive device including braking plates 70 and 76 and balls 78 is non-effective during operation of the drive unit as the braking plates are interlocked and held stationary by energization of winding 65. However, the described arrangement provides for operation of either actuator by the power drive means for the other actuator without either the motor load or the braking load being imposed thereon when the associated motor becomes disabled or otherwise.

While a specific embodiment of the invention has been described in detail to illustrate the application of the principles thereof, it should be understood that the invention may be otherwise embodied without departing from such principles.

What is claimed is:

1. A power transmission unit comprising, in combination, a first rotatable member having a clutching surface; a second rotatable member having a clutching surface frictionally coactable with the first member surface; a winding to produce magnetic flux for establishing frictional engagement between said clutching surfaces; a movable braking member adjacent said second rotatable member; selectively operable means normally effective to lock said braking member against rotation; and means effective upon deenergization of said winding to mechanically bias said second rotatable member into engagement with said braking member to arrest rotation of said second rotatable member while said braking member is locked.

2. A power transmission unit comprising, in combination, a driving disk having a clutching surface; a driven disk having a clutching surface frictionally coactable with the driving disk clutching surface; a winding to produce magnetic flux for establishing frictional engagement between said clutching surfaces; a movable braking member arranged adjacent said driven disk; selectively operable means normally effective to lock said braking member against rotation; and means effective upon deenergization of said winding to mechanically bias said driven disk into engagement with said braking member to arrest rotation of said driven disk while said braking member is locked.

3. A power transmission unit comprising, in combination, a first rotatable member having a clutching surface; a second rotatable member having a clutching surface frictionally coactable with the first member surface; a winding to produce magnetic flux for establishing frictional engagement between said clutching surfaces; a movable braking member adjacent said second rotatable member; selectively operable means normally effective to lock said braking member against rotation; means effective upon deenergization of said winding to mechanically bias said second rotatable member into engagement with said braking member to arrest rotation of said second rotatable member while said braking member is locked; and a speed responsive device effective during deenergization of said winding and when said selectively operable means is conditioned to release said braking member to arrest rotation of said braking member when the speed of rotation of said second rotatable member exceeds a predetermined value and effect a loading thereon to limit its speed.

4. A power transmission unit comprising, in combination, a driving disk having a clutching surface; a driven disk having a clutching surface frictionally coactable with the driving disk clutching surface; a winding to produce magnetic flux for establishing frictional engagement between said clutching surfaces; a movable braking member arranged adjacent said driven disk; selectively operable means normally effective to lock said braking member against rotation; means effective upon deenergization of said winding to mechanically bias said driven disk into engagement with said braking member to arrest rotation of said driven disk while said braking member is locked; and a speed responsive device effective during deenergization of said winding and when said selectively operable means is conditioned to release said braking member to arrest rotation of said braking member when the speed of rotation of said driven disk exceeds a predetermined value and effect a loading thereon to limit its speed.

5. A power transmission unit including, in combination, a first rotatable member having a clutching surface of magnetic material; a second rotatable member having a clutching surface of magnetic material magnetically and frictionally coactable with the first member surface; a movable braking plate having a brake shoe thereon arranged adjacent said second rotatable member; magnetic flux generating means including a winding to produce magnetic flux for establishing frictional engagement between said clutching surfaces; selectively operable means effective to lock said braking plate against rotation; and means effective upon deenergization of said winding to mechanically bias said second member into engagement with said brake shoe to arrest rotation of said second member while said braking member is locked.

6. A power transmission unit including, in combination, a first rotatable member having a clutching surface of magnetic material; a second rotatable member having a clutching surface of magnetic material magnetically and frictionally coactable with the first member surface; a movable braking plate having a brake shoe thereon arranged adjacent said second rotatable member; magnetic flux generating means including a winding to produce magnetic flux for establishing frictional engagement between said clutching surfaces; selectively operable means effective to lock said braking plate against rotation; means effective upon deenergization of said winding to mechanically bias said second member into engagement with said brake shoe to arrest rotation of said second member while said braking member is locked; and a speed responsive device effective during deenergization of said winding and when said selectively operable means is conditioned to release said braking plate to arrest rotation of said braking plate when the speed of said second rotatable member exceeds a predetermined value and effect a loading thereon to limit its speed.

7. A power transmission unit including, in combination, a driving disk having clutching surface; a driven disk having a clutching surface frictionally coactable with the driving disk surface; a winding to produce magnetic flux for establishing frictional engagement between said clutching surfaces; a first movable braking plate arranged adjacent said driven disk and rotatable therewith; a second movable braking plate; said braking plates being interlocked for rotation as a unit but being relatively movable axially; a stationary braking surface arranged adjacent said second movable braking plate; selectively operable means normally effective to lock said braking plates against rotation; resilient means effective upon deenergization of said winding to mechanically bias said driven disk into engagement with said first braking plate to arrest rotation of said driven disk while said braking plates are locked; and speed responsive means operatively associated with said braking plates and effective during deenerigization of said winding and when said selectively operable means is conditioned to release said braking plates for rotation to mechanically bias said second movable braking plate into engagement with said stationary braking surface to arrest rotation of said braking plates when the speed of said driven disk exceeds a predetermined value and effect a loading thereon to limit its speed.

8. A power transmission unit including, in combination, a driving disk having a clutching surface; a driven disk having a clutching surface frictionally coactable with the driving disk surface; a member stationary with respect to and surrounding said disks; a first movable braking plate arranged adjacent said driven disk and rotatable therewith; a second movable braking plate; said braking plates being interlocked for rotation as a unit but being relatively movable axially; a stationary braking surface arranged adjacent said second movable braking plate; a first winding to produce magnetic flux for establishing frictional engagement between said clutching surfaces and a second winding; selectively operable means normally effective to energize said second winding for producing magnetic flux for establishing frictional engagement between said stationary member and said first movable braking plate to arrest rotation of said braking plates; resilient means effective upon deenerigization of said first winding to mechanically bias said driven disk into engagement with said first braking plate to arrest rotation of said driven disk while said braking plates are locked; and speed responsive means operatively associated with said braking plates and effective during deenergization of said second winding and when said selectively operable means is conditioned to release said braking plates for rotation to mechanically bias said second movable braking plate into engagement with said stationary braking surface to arrest rotation of said braking plates when the speed of said driven disk exceeds a predetermined value and effect a loading thereon to limit its speed.

9. A driving and speed control unit including power drive means; a driven system; a driving member connected to said power drive means and having a clutching surface; a driven member connected to said driven system and having a clutching surface frictionally coactable with the driving member surface; a winding energized upon energization of said power drive means to produce magnetic flux for establishing frictional engagement between said clutching surfaces; a movable braking member arranged adjacent said driven member and rotatable therewith; selectively operable means normally effective to lock said braking member against rotation; and resilient means effective upon deenergization of said power drive means and said winding to mechanically bias said driven member into engagement with said braking member to arrest motion of said driven system while said braking member is locked.

10. A driving and speed control unit including an electric motor having an armature shaft; a driven system; a driving member having a hub connected to said armature shaft and a clutching surface; a driven member connected to said driven system and having a clutching surface frictionally coactable with the driving member surface; a winding in electric circuit connection with said electric motor and energized upon energization of said electric motor to produce magnetic flux for establishing frictional engagement between said clutching surfaces; a movable braking member arranged adjacent said driven member and rotatable therewith; selectively operable means normally effective to lock said braking member against rotation; and resilient means effective upon deenergization of said electric motor and said winding to mechanically bias said driven member into engagement with said braking member to arrest motion of said driven system while said braking member is locked.

11. A driving speed control unit including power drive means; a driven system; a driving disk connected to said power drive means and having a clutching surface; a driven disk connected to said driven system and having a clutching surface frictionally coactable with the driving disk surface; a winding energized upon energization of said power drive means to produce magnetic flux for establishing frictional engagement between said clutching surfaces; a first movable braking plate arranged adjacent said driven disk and rotatable therewith; a second movable braking plate; said braking plates being interlocked for rotation as a unit but being relatively movable axially; a stationary braking surface arranged adjacent said second movable braking plate; selectively operable means normally effective to lock said braking plates against rotation; resilient means effective upon deenergization of said power drive means and said winding to mechanically bias said driven disk into engagement with said first braking plate to arrest rotation of said driven disk while said braking plates are locked; and speed responsive means disposed between said braking plates and effective during deenergization of said power drive means and said winding and when said selectively operable means is conditioned to release said braking plates for rotation to bias said second movable braking plate into engagement with said stationary braking surface to arrest rotation of said braking plates when the speed of said driven system exceeds a predetermined value and effect a loading thereon to limit its speed.

12. A driving and speed control unit including power drive means; a driven system; a driving disk connected to said power drive means and having a clutching surface; a driven disk connected to said driven system and having a clutching surface frictionally coactable with the driving disk surface; a member stationary with respect to and surrounding said disks; a first movable braking plate arranged adjacent said driven disk and rotatable therewith; a second movable braking plate; said braking plates being interlocked for rotation as a unit but being relatively movable axially; a stationary braking surface arranged adjacent said second movable braking plate; a first winding energized upon energization of said power drive means to produce magnetic flux for establishing frictional engagement between said clutching surfaces and a second winding; selectively operable means normally effective to energize said second winding to produce magnetic flux for establishing frictional engagement between said member and said first movable braking plate to arrest rotation thereof; resilient means effective upon deenergization of said power drive means and said first winding to mechanically bias said driven disk into engagement with said first braking plate to arrest rotation of said driven disk while said braking plates are locked; and speed responsive means disposed between said braking plates and effective during deenergization of said power drive means and said first winding and when said selectively operable means is conditioned to deenergize said second winding to mechanically bias said second movable braking plate into engagement with said stationary braking surface to arrest rotation of said braking plates when the speed of said driven system exceeds a predetermined value and effect a loading thereon to limit its speed.

13. A driving and speed control unit including an electric motor having an armature shaft; a driven system; a driving disk having a hub connected to said armature shaft and a clutching surface; a driven disk connected to said driven system and having a clutching surface frictionally coactable with the driving disk surface; a winding in electric circuit connection with said electric motor to produce magnetic flux for establishing frictional engagement between said clutching surfaces; a first movable braking plate arranged adjacent said driven disk and rotatable therewith; a second movable braking plate; said braking plates being interlocked for rotation as a unit but being relatively movable axially; a stationary braking surface arranged adjacent said second movable braking plate; selectively operable means normally effective to lock said braking plates against rotation; resilient means effective upon deenergization of said electric motor and said winding to mechanically bias said driven disk into engagement with said first braking plate to arrest rotation of said driven disk while said braking plates are locked; and speed responsive means disposed between said braking plates and effective during deenergization of said electric motor and said winding and when said selectively operable means is conditioned to release said braking plates to bias said second movable braking plate into engagement with said stationary braking surface to arrest rotation of said braking plates when the speed of said driven system exceeds a predetermined value and effect a loading thereon to limit its speed.

14. A driving and speed control unit including an electric motor having an armature shaft; a driven system; a driving disk having a hub connected to said armature shaft and a clutching surface; a driven disk connected to said driven system and having a clutching surface frictionally coactable with the driving disk surface; a member stationary with respect to and surrounding said disks; a first movable braking plate arranged adjacent said driven disk and rotatable therewith; a second movable braking plate; said braking plates being interlocked for rotation as a unit but being relatively movable axially; a stationary braking surface arranged adjacent said second movable braking plate; a first winding in electric circuit connection with said electric motor to produce magnetic flux for establishing frictional engagement between said clutching surfaces and a second winding; selectively operable means normally effective to energize said second winding to produce magnetic flux for establishing frictional engagement between said member and said first movable braking plate to arrest rotation thereof; resilient means effective upon deenergization of said electric motor and said first winding to mechanically bias said driven disk into engagement with said first braking plate to arrest rotation of said driven disk while said braking plates are locked; and speed responsive means disposed between said braking plates and effective during deenergization of said electric motor and said first winding and when said selectively operable means is conditioned to deenergize said second winding to bias said second braking plate into engagement with said stationary braking surface to arrest rotation of said braking plates when the speed of said driven system exceeds a predetermined value and effect a loading thereon to limit its speed.

15. Actuating apparatus for retractable aircraft landing gear comprising, in combination, power drive means; a mechanical actuator operatively connected to such landing gear to extend and retract the same; a driving disk connected to said power drive means and having a clutching surface; a driven disk connected to said actuator and having a clutching surface frictionally coactable with the driving disk surface; a winding energized upon energization of said power drive means to produce magnetic flux for establishing frictional engagement between said clutching surfaces to connect said power drive means to said actuator to extend and retract the landing gear; a movable braking member arranged adjacent said driven disk and rotatable therewith; means effective during power operation of the aircraft to lock said braking member against rotation; resilient means effective upon deenergization of said power drive means to bias said driven disk into engagement with said movable braking member to instantly stop movement of said actuator and said landing gear while said braking member is locked; and a speed responsive device operatively associated with said movable braking member and effective when said selectively operable means is conditioned to release said braking member during non-power operation of said landing gear to arrest rotation of said movable braking member and said driven disk when the speed of said actuator exceeds a predetermined value to control the rate of movement of said landing gear and effect a loading thereon to limit its speed.

16. Actuating apparatus for retractable aircraft landing gear comprising, in combination, power drive means; a mechanical actuator operatively connected to such landing gear to extend and retract the same; a driving disk connected to said power drive means and having a clutching surface; a driven disk connected to said actuator and having a clutching surface frictionally coactable with the driving disk surface; a member stationary with respect to and surrounding said disks; a winding energized upon energization of said power drive means to produce magnetic flux for establishing frictional engagement between said clutching surfaces to connect said power drive means to said actuator to extend and retract the landing gear; a movable braking member arranged adjacent said driven disk and rotatable therewith; a second winding normally energized during power operation of the aircraft to produce magnetic flux for establishing frictional engagement between said stationary member and said movable braking member to arrest rotation thereof during power operation of the landing gear; resilient means effective upon deenergization of said power drive means to bias said driven disk into engagement with said movable braking member to instantly stop movement of said actuator and said landing gear while said braking member is locked; and a speed responsive device operatively associated with said movable braking member and effective during non-power operation of said landing gear and upon deenergization of said second winding to arrest rotation of said movable braking member and said driven disk when the speed of said actuator exceeds a predetermined value to control the rate of movement of said landing gear and effect a loading thereon to limit its speed.

17. Actuating apparatus for retractable aircraft landing gear comprising, in combination, an electric motor; a mechanical actuator operatively connected to such landing gear to extend and retract the same; a driving disk connected to said electric motor and having a clutching surface of magnetic material; a driven disk connected to said actuator and having a clutching surface of magnetic material magnetically and frictionally coactable with the driving disk surface; a member of magnetic material stationary with respect to and surrounding said disks; a first winding in electric circuit connection with said electric motor to produce magnetic flux for establishing frictional engagement between said clutching surfaces to connect said electric motor to said actuator to extend and retract the landing gear; a movable braking plate arranged adjacent said driven disk and rotatable therewith; a second winding normally energized during power operation of the aircraft to produce magnetic flux for establishing frictional engagement between said member and said movable braking plate to arrest rotation thereof during power operation of the landing gear; resilient means effective upon deenergization of said electric motor and said first winding to mechanically bias said driven disk into engagement with said movable braking plate to instantly stop movement of said actuator and said landing gear while said braking member is locked; and a speed responsive device operatively associated with said movable braking plate and effective during non-power operation of said landing gear and upon deenergization of said second winding to arrest rotation of said movable braking plate and said driven disk when the speed of said actuator exceeds a predetermined value to control the rate of movement of said landing gear and effect a loading thereon to limit its speed.

18. Actuating apparatus for retractable aircraft landing gear comprising, in combination, an electric motor; a mechanical actuator operatively connected to such landing gear to extend and retract the same; a driving disk connected to said electric motor and having a clutching surface of magnetic material; a driven disk connected to said actuator and having a clutching surface of magnetic material magnetically and frictionally coactable with the driving disk surface; a member of magnetic material stationary with respect to and surrounding said disks; a first winding in electric circuit connection with said electric motor to produce magnetic flux for establishing frictional engagement between said clutching surfaces to connect said electric motor to said actuator to extend and retract the landing gear; a first movable braking plate arranged adjacent said driven disk and rotatable therewith; a second movable braking plate; said braking plates being interlocked for rotation as a unit but being relatively movable axially; a stationary braking surface arranged adjacent said second movable braking plate; a second winding normally energized during power operation of the aircraft to produce magnetic flux for establishing frictional engagement between said member and said first braking plate to arrest rotation of said braking plates during power operation of the landing gear; resilient means effective upon deenergization of said electric motor and said first winding to mechanically bias said driven disk into engagement with said first braking plate to instantly stop movement of said actuator and said landing gear while said braking plates are locked; and speed responsive means disposed between said braking plates and effective during non-power operation of said landing gear and upon deenergization of said second winding to mechanically bias said second movable braking plate into engagement with said stationary braking surface to arrest rotation of said braking plates and said driven disk when the speed of said actuator exceeds a predetermined value to control the rate of movement of said landing gear and effect a loading thereon to limit its speed.

WILLIAM P. LEAR.